United States Patent
Prokopi et al.

(10) Patent No.: US 9,781,127 B2
(45) Date of Patent: Oct. 3, 2017

(54) METHOD AND APPARATUS TO REGULATE A DIGITAL SECURITY SYSTEM THAT CONTROLS ACCESS TO A RESOURCE

(71) Applicant: Orange, Paris (FR)

(72) Inventors: Maria Prokopi, Richmond London (GB); Mobeen Qureshi, Guildford (GB); Zaheer Ahmad, Southall London (GB)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/737,235

(22) Filed: Jun. 11, 2015

(65) Prior Publication Data
US 2015/0365423 A1 Dec. 17, 2015

(30) Foreign Application Priority Data
Jun. 13, 2014 (EP) .................................... 14305906

(51) Int. Cl.
H04L 29/06 (2006.01)
G06F 21/31 (2013.01)
H04L 29/08 (2006.01)

(52) U.S. Cl.
CPC .......... *H04L 63/105* (2013.01); *G06F 21/316* (2013.01); *H04L 63/08* (2013.01);
(Continued)

(58) Field of Classification Search
CPC .. G06Q 30/02; G06Q 30/0201; G06Q 50/265; G06Q 30/0271; G06Q 30/0255;
(Continued)

(56) References Cited

U.S. PATENT DOCUMENTS 7,441,264 B2 * 10/2008 Himmel .............. G06F 21/6218
  713/182
7,865,726 B2 * 1/2011 Corley .................... G06F 21/53
  709/201

(Continued)

FOREIGN PATENT DOCUMENTS

WO WO 2014/043360 A1 3/2014

OTHER PUBLICATIONS

European Search Report completed on Nov. 21, 2014 for European Application No. EP 14 30 5906 filed Jun. 13, 2014, 1 page.

*Primary Examiner* — Thanhnga B Truong
(74) *Attorney, Agent, or Firm* — Knobbe, Martens, Olson & Bear LLP

(57) ABSTRACT

A method and system to regulate a digital security system that controls access to a resource is disclosed. The system controls access to the resource according to a multi-level security protocol including a high-security-level access protocol and a low-security-level access protocol. The regulation method and system are configured to collect data from a set of user-data sources with which the user interacts during his daily life and, based on the collected data, to compute security parameters characterizing user activity. The computed security parameters are compared to a digital profile that models the characteristic behavior of this user. When the comparison indicates that the observed user activity is inconsistent with the digital behavior profile, the digital security system is regulated to set (or maintain) it in an operating state such that, when the user requests access to the resource in the future, the system will automatically implement the high-security-level access protocol.

20 Claims, 6 Drawing Sheets

(52) U.S. Cl.
CPC .. *H04L 63/0823* (2013.01); *G06F 2221/2113* (2013.01); *H04L 67/22* (2013.01); *H04L 67/306* (2013.01); *H04L 2463/082* (2013.01)

(58) Field of Classification Search
CPC .......... G06F 11/00; G06F 7/04; G06F 15/173; G06F 21/552; G06F 21/6218; G06F 21/316; H04L 9/00; H04L 63/1425; H04L 63/20; H04L 63/1433; H04L 63/102; H04L 63/0272; H04L 63/0263; H04L 69/28; H04L 63/08
USPC .......... 713/152, 182; 726/2, 3, 25; 705/7.29; 709/225
See application file for complete search history.

(56) References Cited

U.S. PATENT DOCUMENTS

| | | | |
|---|---|---|---|
| 8,881,289 B2* | 11/2014 | Basavapatna | G06F 21/552 726/25 |
| 2009/0187962 A1 | 7/2009 | Brenneman et al. | |
| 2010/0192209 A1 | 7/2010 | Steeves et al. | |
| 2011/0016534 A1 | 1/2011 | Jakobsson et al. | |
| 2014/0032259 A1* | 1/2014 | LaFever | G06Q 30/0201 705/7.29 |

* cited by examiner

METHOD AND APPARATUS TO REGULATE A DIGITAL SECURITY SYSTEM THAT CONTROLS ACCESS TO A RESOURCE

Any and all applications for which a foreign or domestic priority claim is identified in the Application Data Sheet as filed with the present application are hereby incorporated by reference under 37 CFR 1.57 in their entireties. In particular, the disclosure of European Application No. 14305906.1, filed on Jun. 13, 2014, is incorporated by reference herein in its entirety.

Some embodiments described herein relate to the field of digital security and, in particular, to a method and apparatus to regulate a digital security system that controls access to a resource. Some embodiments described herein relate to a computer program comprising instructions to implement the regulation method when the instructions are executed by a processor, and to electronic devices comprising components of the regulation system.

It has become commonplace for users to make use of digital resources such as digital services, applications and data sources, typically using an electronic device to access the digital resource via a network (e.g. a telecommunications network, the Internet, and so on) or accessing the resource directly on an electronic device. For example, a user may download and playback music and video content using a mobile phone, perform an online banking transaction using a tablet or personal computer, and so on.

Likewise, various digital security systems exist which control access to non-digital resources. For example, some digital security systems control access to an engine-start function in a car, others control access to a physical location by controlling the unlocking/opening of a door, and so on.

Service providers and others who wish users to access their resources face many security problems. For example, attempts to access the resource may come from a person who is not an authorized user but who is attempting to make use of identification details or devices belonging to an authorized user. Accordingly, various different digital security systems have been proposed with the aim of ensuring that access to resources is reserved to properly authorized parties operating within the scope of their assigned permissions.

Certain digital security systems monitor accesses that are made (or attempted) to a resource in order to determine, after the event, that there is a problem with a given access that has been made or attempted. The determination that improper access has been made may cause an alarm to be generated or a security breach to be logged. Other digital security systems deny access to a resource if the security system makes an assessment that there is an anomaly with the access attempt. A significant disadvantage of digital security systems of these types is that they merely detect accesses/attempts that may constitute a security breach, they do not necessarily prevent a security breach from taking place.

Conventionally, digital security systems that control access to a resource are regulated so that they operate at the time when a user makes an attempt to access the resource, and they are based on detecting—at the time of the access attempt—some anomaly in the circumstances of the access. For example, the security system may detect that the user is making the access request using a digital device that is unauthorized or simply is different from the device that they normally use. In the case where the security system detects an anomaly at the time of the access attempt, the security system will typically prompt the user to provide some additional credentials or authentication data as a condition to gain access to the requested service, application or data source.

Digital security systems of the above type provide a degree of security but they have various disadvantages. One disadvantage is that the process of detecting an anomaly takes a finite amount of time and introduces an undesired delay into the accessing procedure. The user experiences this as undesired latency (time delay) between the moment when the user attempts to access the resource and the time when the digital security system prompts the user to supply additional credentials/authentication data.

On the other hand, in recent years many new techniques have been introduced for enhancing security in relation to the use of digital devices, whether they be mobile devices (e.g. telephones, tablets, laptops, portable digital assistants, and so on) or fixed devices (e.g. personal computers, smart televisions and other networked smart devices, and so on). More complex algorithms and methods are being introduced in digital security systems, for example some security methods require complex passwords and even access to secure smartcards to prove the user identity. However, the complexity of these measures is becoming a deterrent to users, especially when they have increasing numbers of applications on their personal devices, which can multiply the numbers of different passwords and security methods the user must employ. Multi factor authentication, use of multiple smart cards, finger prints, combination of one time password and PIN and chip all complicate the user experience. Moreover, even with such complex authentication methods, security breaches are on the rise.

Some embodiments described herein address the above-mentioned disadvantages.

Some embodiments described herein provide a method of regulating a digital security system, the digital security system controlling access to a resource according to a multi-level security protocol including a high-security-level access protocol and a low-security-level access protocol, the method comprising:
  collecting data from a set of user-data sources, the collected data comprising information indicative of user activity;
  based on the collected data, computing a set of one or more security parameters characterizing user activity;
  comparing the computed set of security parameters to a digital profile, the digital profile representing a model of behavior that is characteristic of said user, and
  responsive to the comparing indicating that the user activity is inconsistent with the digital behavior profile, regulating the digital security system to be in an operating state wherein the digital security system will automatically implement the high-security-level access protocol when said user requests access to the resource in the future.

The user-data sources may be substantially any sources that provide data pertinent to the user's activities and include, but are not limited to: devices (belonging to the user or belonging to others), sensors, software applications, social networking and other websites, emails, and so on. The set of user-data sources may include one, two, or more than two user-data sources.

Some embodiments of the regulation methods described herein control the operating state of the digital security system in a pre-emptive and preventive manner based on ongoing monitoring of data generated by user activity and on comparison of the monitored activity against a digital behavior profile that is considered to be characteristic of this user. When there are inconsistencies between the user's monitored activity and the user's digital behavior profile this may be due to an imposter pretending to be the user.

In some embodiments of the regulation methods described herein, the access protocol a user has to follow to gain access to a resource at a given time depends on whether or not, beforehand, the data generated by the user's activity has been conforming to the user's digital behavior profile. Thus, when monitored user behavior casts doubt on whether or not the user is being impersonated, this regulation method sets the digital security system into an operating state such that when the user makes an access attempt at a future time it will automatically implement an access protocol having a relatively higher security level (commensurate with the fact that some suspicion already exists that the user may be the subject of impersonation).

Thus, at the time when a user device makes an attempt to access a resource the digital security system controlling access is already in an appropriate operating state so that it requires the user to supply additional credentials and/or authentication data (in a case where the monitored data generated by the user's activity has not been conforming to his characteristic behavior profile). In other words, at the time when the user attempts access the digital security system does not need to perform a procedure in order to detect an anomaly, the digital security system is already in an operating state that imposes relatively higher security requirements for this user. Thus there is a shorter time delay between a user's access attempt and a time when the user is prompted to supply additional credentials/authentication data.

Typically, the regulation method computes the security parameters from monitoring data that is generated automatically as the user's behavior during his daily life causes effects in sensors and/or devices and/or software and, based on this monitoring data, the regulation method automatically regulates the digital security system to be in a state to apply a protocol of an appropriate security level when the user next attempts access. This regulation method enhances the security of resources that may be accessed by a user and does so in a manner that provides the user with a seamless experience.

Furthermore, in response to the comparing indicating that the user activity is consistent with the digital behavior profile, the regulation method may regulate the digital security system to be in an operating state wherein the digital security system will automatically implement the low-security-level access protocol when said user requests access to the resource in the future. This technique ensures that, in the course of variations in the extent to which a user's behavior/activity matches the digital behavior profile, the operating state of the digital security system is regulated in a dynamic manner so that it will apply a protocol of an appropriately high or low security level. It is to be understood that the references here to a "high" or "low" security level are intended to be relative.

In certain embodiments, when the comparing indicates that the user activity departs from the digital behavior profile a set of one or more exception rules may be applied to calculate whether or not the user activity nevertheless conforms to acceptable behavior, and the comparing only indicates that the user activity is inconsistent with the digital behavior profile in the event that the calculation determines that the user activity fails to conform to acceptable behavior.

In embodiments of the regulation method that make use of exception rules, it is possible to cater for user behavior that does not conform to the user's most typical habits but is still likely to be authentic. This reduces the risk that the regulation method will set a high security level on an occasion when the observed divergence in user behavior arises from "natural" variability in human behavior (rather than arising from appropriation of the user's identity, or devices, by an imposter).

In the regulation method, the digital behavior profile may be updated based on the security parameters that are computed in the computing step. In this way, over time the digital behavior profile can evolve to become more and more representative of the user's typical behavior, thus increasing the reliability of the regulation method.

There can be great diversity in the nature of the collected data that is generated as a user's daily activities impact the digital eco-system. So, when the collected data is being used as a basis for detecting anomalies in the user's behavior the characteristic features that enable anomalies to be detected may be different depending on the particular nature of the collected data (e.g. depending on: which physical parameter the data represents, which type of sensor/device/application generated the data, other aspects of the context in which the data is generated, and so on). In certain embodiments, the regulation method may be implemented in a manner which computes the security parameters by categorizing collected data into defined categories, and determines, for each category, a pattern applicable to the collected data that is assigned to that category. In this way, the various security parameters can take into account the particular features of collected data of different types, enabling the security parameters to more accurately represent information that has a real-world meaning.

In such embodiments, typically the regulation method makes use of a digital behavior profile that is based on the same category structure as is used for categorizing the collected data. In this case the digital behavior profile comprises pattern data that is characteristic of the user and relates to at least one of the defined categories. (Typically, in a case where the digital behavior profile evolves over time, some of the categories may be unpopulated to start off with, or are populated with inferred or default data, but over time the various categories of the behavior profile become populated with pattern data that is characteristic of this user's habitual or typical behavior). In this case, the computed security parameters may be compared to the digital behavior profile by comparing patterns in the collected data that is assigned to a specific set of one or more categories to patterns in that portion of the digital behavior profile that relates to the same set of categories. This approach makes it easier to detect instances when the user's behavior in one respect diverges significantly from his normal habits in that respect, even if at the same time there is an overall resemblance between the total set of current collected data and the behavior profile considered as a whole.

Some embodiments described herein further provide a computer program comprising instructions to implement the above method when the program is executed by a processor.

Some embodiments described herein still further provide a regulation system configured to regulate a digital security system, the digital security system controlling access to a resource according to a multi-level security protocol including a high-security-level access protocol and a low-security-level access protocol, the regulation system comprising:

a data collection unit configured to receive data from a set of user-data sources, the collected data comprising information indicative of user activity;

a computation unit configured to compute, from the collected data, security parameters characterizing user activity;

an evaluation unit configured to determine whether security parameters computed by the computation unit are consistent with a digital profile, the digital profile representing a model of behavior that is characteristic of said user, and a regulation unit configured, in response to the evaluation unit determining that the user activity is inconsistent with the digital behavior profile, to regulate the digital security system to be in an operating state wherein the digital security system will automatically implement the high-security-level access protocol when said user requests access to the resource in the future.

The regulation system may be implemented in a wide variety of configurations. For example, the regulation system may be implemented in a dedicated device which is configured to regulate one or more digital security systems that are external to the dedicated device. On the other hand, the regulation system may be implemented in a device which also comprises the digital security system that is to be regulated. It will be understood that an electronic device may be provided which comprises all the components of the regulation system. However, as an alternative, the components of the regulation system may be distributed over two, three, or more than three devices.

Certain embodiments of the regulation system comprise a storage unit that stores the data of the behavior profile. This storage unit may be integrated into the same device as holds the regulation unit, but this is not essential. Indeed, the security of the system may be enhanced by storing the digital behavior profile in a storage unit of a server that is maintained by a network operator, service provider, or other trusted third party. Certain embodiments described herein make use of cloud-computing techniques in which the digital behavior profile is stored in the cloud and is generated/developed based on data provided by user-data sources that may be widely distributed in space.

Certain embodiments of the regulation system comprise a profile manager that is configured to update the digital behavior profile based on the computed security parameters. This profile manager unit may be integrated into the same device as holds the regulation unit, or integrated into a further device that holds the storage unit or, indeed, integrated into a separate device.

In the regulation system, the evaluation unit may be configured to communicate with an external server which applies exception rules to determine when user activity departs from usual but still is permissible.

Some embodiments described herein yet further provide an electronic device comprising:

a data collection unit configured to receive data from a set of user-data sources, the collected data comprising information indicative of user activity, and to transmit to an external device user-activity data based on the data collected from the user-data sources; and a regulation unit adapted to regulate a digital security system, the digital security system controlling access to a resource according to a multi-level security protocol including a high-security-level access protocol and a low-security-level access protocol;

wherein the regulation unit is configured:

to detect, in signals received from the external device, indications signifying whether user-activity data sent by the electronic device to the external device represents user activity consistent with a digital profile, the digital profile representing a model of behavior that is characteristic of said user, and in response to detecting an indication signifying that said user-activity data represents user activity inconsistent with the digital behavior profile, regulating the digital security system to be in an operating state wherein the digital security system will automatically implement the high-security-level access protocol when said user requests access to the resource in the future.

Further features and advantages of embodiments of the present invention will become apparent from the following description of said embodiments, which is given by way of illustration and not limitation, illustrated by the accompanying drawings, in which.

Figure 2:
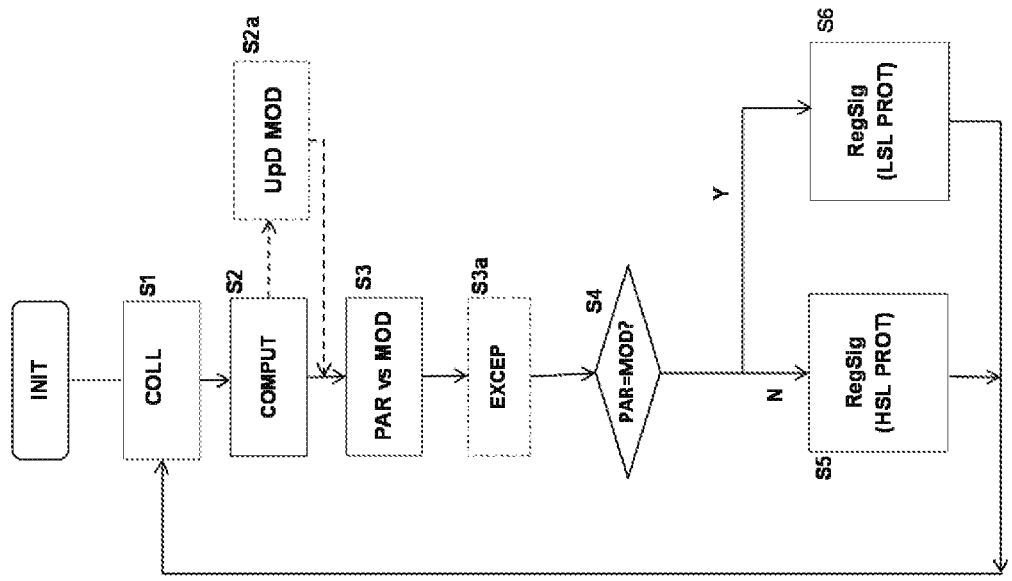
FIG. 2 is a flow diagram showing the steps in one example of a regulation method.

Some embodiments described herein exploit the fact that nowadays many people live their lives within a digital eco-system that contains a range of digital devices, sensors, network elements, applications, websites and so forth with which these people interact. As the user functions within this digital eco-system his activities result in an ongoing generation of a large bank of data.

For example, first thing in the morning a user may switch on his mobile phone to check for any messages, then carry the phone with him throughout the rest of the day. Typically the phone will log details of the communications engaged in by the user as well as producing data from various built-in sensors (e.g. location data from a GPS sensor, details of Bluetooth devices which have paired with this phone during the day, etc.) in an ongoing manner. Perhaps during breakfast the user will access a social messaging site on a tablet device. Software installed on the tablet device may track the user's browsing history. If the user's digital eco-system is in a "connected" environment (e.g. he lives in a so-called "smart home", or works in a so-called "smart office") usually data will be generated as he uses some of the connected devices (e.g. his smart TV may generate data regarding the channels or programmes viewed, the times and duration of viewing, and so on).

Increasingly, in the field of information technology new sensors are being proposed that can communicate with electronic devices that users employ habitually in their daily life. Some of these sensors are wearable devices (e.g. wristbands, ankle bands, and so on) that transmit health data, environmental data etc. to the user's mobile phone or other digital device. These sensors, and others, form part of the digital eco-system and contribute to the mass of digital data that is generated as users goes about their daily lives.

Various embodiments described herein monitor data that is generated as a user functions within the digital sphere. Typical monitored data comprises information related to factors such as, for example: a user's location, status, activity, behavior, environment, browsing history, preferences, and so on. Depending on the nature of the monitored data it may be necessary or expedient to perform preliminary processing to extract salient information that may be relevant for building up a profile or model that is characteristic of this user, e.g. a profile serving to help differentiate this user from another.

Unless the context demands otherwise, references below to "user-data" or "user-data sources" refer to any data or data sources that provide data from which information characteristic of a user may be derived. Unless the context demands otherwise, references below to "collected data" do not differentiate between raw monitored data and data that has been subject to preliminary processing.

Typically these embodiments process the collected data to produce one or more security parameters which may be characteristic of: user behavior, specific activities, user preferences, and the like. These embodiments implement an intelligent algorithm that generates a unique profile for each user taking into account their security parameters. By analogy with a fingerprint, this profile may be designated a "digital print".

Some embodiments described herein exploit the digital print to control how a security system that controls access to a resource (e.g. a digital service, a data source or software application, a device or object, a physical location, etc.) is regulated. Data that is gathered as a user goes about their daily life is processed to update the digital print and to assess the extent to which security parameters calculated from the current data conform to or depart from the digital print. If this assessment determines that the current data departs from the digital print in a significant manner and/or to a significant degree, then the operating state of the digital security system controlling access to a resource source is regulated so that when the user attempts an access at a future time, the digital security system will implement a relatively high-security-level access protocol at that time. If the collected data is consistent with the digital print then the regulation method and system reset or maintain the digital security system in an operating state such that when the user attempts an access at a future time, the digital security system will implement a relatively low-security-level access protocol at that time.

Some embodiments described herein introduce an efficient and intelligent way of exploiting digital data that is generated as part of the user's daily life, to create and maintain an autonomous and adaptive digital print. This digital print is exploited to enhance security in a manner that is seamless for the user and which reduces latency when the user seeks access to a resource.

General features of one example embodiment of a regulation system will now be described with reference to FIG. 1.

Figure 1:
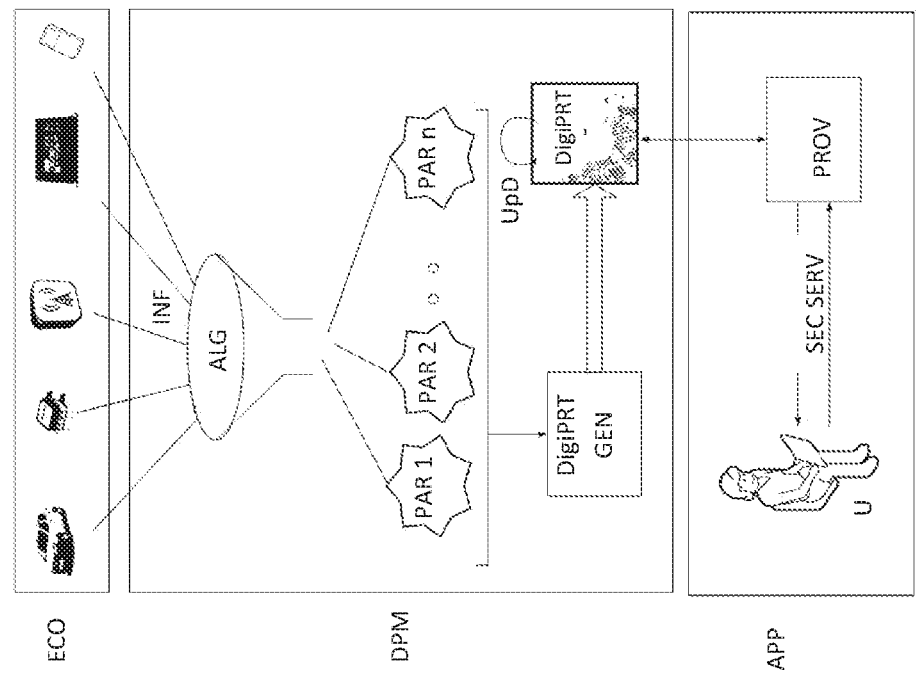
FIG. 1 is a diagram illustrating the overall architecture of an example embodiment of a regulation system.

FIG. 1 is a diagram giving an overview of the general architecture of this embodiment of regulation system and its operating environment. In this example, the regulation system makes use of a digital print mechanism DPM that generates, maintains and exploits a digital print (designated DigiPRT in FIG. 1) which embodies data that is characteristic of the user's habitual or characteristic behavior, preferences and the like. The digital print mechanism obtains data from the user's digital eco-system ECO (by which is meant the digital environment in which the user functions as he lives his daily life).

The digital print mechanism DPM operates to regulate a digital security system implemented in the context of a specific application (APP). In the example illustrated in FIG. 1 the regulated digital security system controls access by a customer U to a secure digital service (SEC SERV) that is offered by a service provider (PROV). It is to be understood that regulation systems and methods described herein may be applied to regulate digital security systems of other types, in particular, digital security systems which control access to substantially any resource (service, software application, data source, device or object, physical location, etc.).

As FIG. 1 indicates, the regulation system may obtain input data from substantially any source of user-data in the user's digital eco-system ECO. Source devices may include (but are not limited to) smart TVs, meters, phones, tablets, laptops, projectors, printers etc. and the collected data can be data from these devices' sensors and/or from applications (pieces of software) running on the devices.

In addition, the digital print mechanism may be able to obtain information relevant to the user's activities, behavior etc. from shared and public devices (or personal devices belonging to other people, e.g. devices belonging to the user's friends and family members), which connect to the user's devices as he goes about his daily routine. For example, as the user goes about his daily life his devices may interact with sensors such as car kits, Wi-Fi hotspots, or even (in an office environment) projectors and printers: these interactions generate data that can be input to the digital print mechanism.

The sensors and devices of the user's digital eco-system provide data which can be translated by the digital print mechanism into parameters that represent some meaningful aspect of user behavior/preferences. Typically, these devices also hold applications implementing functions such as messaging, calling, mobile payments, calendar, and so forth, and hold content such as music, games, books, videos etc. that the user accesses as part of his/her daily routine. Data collected by the daily usage of such content/applications may also be processed by the digital print mechanism to generate and update the digital print.

Sources of user-data may include the following (although it is to be understood that this is not intended to be an exhaustive list): devices, sensors, the user himself (e.g. via explicit input of information), software applications, and enablers (that is, modules or software applications that are configured to procure and/or pre-process data for supply to the DPM).

Examples of common sensors that may provide data for collection by the digital print mechanism DPM include, but are not limited to: sensors associated with the user's mobile devices (e.g. commercial cellphones), for example: location sensors or systems (e.g., global positioning system (GPS) trackers, wireless fidelity (WIFI), cell identification (Cel-lID), triangulation, etc.), acceleration sensors (e.g., accelerometers), magnetic sensors (e.g., magnetometers, compasses, etc.), temperature sensors, air quality sensors, ambient light sensors; worn sensors (e.g. monitoring physiological factors such as heart rate); eye-blink or movement sensors; microphones; and pressure sensors.

Examples of user-data that may be monitored from software applications include, but are not limited to: telephone call history, contacts, online purchasing history, tweets, Facebook messages, web browsing history, forum posts, emails, selected content, preferences, and so on.

In certain implementations, the architecture of FIG. 1 can include, in the user's digital eco-system, parties such as administrators, service providers, network operators and the like, who already gather user-data in the course of providing services to their subscribers and customers.

Certain embodiments described herein include registration functionality enabling the user to exercise partial or total control over which data-sources can supply data to the DPM and;/or which types of data will be supplied. In such embodiments, typically the user decides which devices, sensors and/or software applications he wishes to serve as sources of user-data for the DPM, and registers those devices with a data-source registration unit of the regulation system (e.g. by providing MAC addresses of the selected devices). In a similar way, the registration functionality may allow the user to prevent the supply of certain types of data to the DPM.

In certain embodiments of the regulation method and system, the digital print mechanism obtains from the sensors, applications, etc. data that is being generated in any event as the user goes about his daily life. Such embodiments place little or no additional data-generation load on the data sources.

The digital print mechanism DPM makes use of an appropriate algorithm (ALG) to generate a set of security parameters (PAR1, PAR2, ..., PARn) by processing the data (INF) collected from the various user-data sources. The nature and number of the security parameters can vary greatly depending on the application and the choices of the system designer.

The security parameters are constructed so that they represent information that is characteristic of the user, for example, information describing the user's routine or habitual behavior: typically, his habitual behavior in particular contexts.

For instance, some security parameters may represent observed/typical/habitual GPS locations of this user at different times of the day, and on different days of the week. Other security parameters may represent the IDs of devices this user habitually uses at particular times of day, days of week, when in particular locations, under particular circumstances. Yet other security parameters may represent the user's habits in regard to use of software applications when at work or when at home. Still other security parameters may represent activities the user habitually engages in at particular times of the day (bearing in mind that activities such as walking, running, travelling in a car, being inside or outdoors, and many others, can be deduced from data provided by personal sensing technologies and by sensors that are commonly included in commercial cellphones.

According to certain embodiments, the digital print mechanism DPM generates the set of security parameters by a method which includes a step of associating context to the collected data INF, as well as a step of generating the security parameters based on the collected data and its associated context.

The algorithm ALG that computes the security parameters may be configured to categorize collected data into different categories, for example based on knowledge of relationships that exist between different types of data and different user activities. According to certain embodiments, parameters of different categories carry different weights. For example, data obtained from third parties may be assigned a lower weight (less trusted status) than data obtained from the device of a member of the user's family. Further, data may be categorized in terms of whether it is dynamic, static, differential, hard-coded, variable, and so on.

The nature of the security parameters changes affects how they are instantiated and, in particular, whether they are represented using numerical values, data sets, lists, matrices, vectors, patterns, and so on. It is to be understood that the invention is not particularly limited with regard to the manner in which the security parameters are instantiated.

The calculated security parameters are processed to produce a digital print or profile which represents, in digital form, behavior that is characteristic of this user, for example behavior that is characteristic of this user in different contexts (e.g. daily routine, habits, and so forth). The digital print is updated in an ongoing manner as more data is gathered.

In the example of FIG. 1 the digital print is generated by a generator unit (DigiPRT GEN) which forms, from the security parameters PAR, an overall digital representation that models the user's characteristic or routine behavior. This representation may be referred to as a digital behavior profile. The manner in which the security parameters are combined to form the overall profile depends on the nature of the security parameters themselves and on choices made by the system designer (e.g. as a function of the intended application).

For example, the digital behavior profile may take the form of a vector in multi-dimensional space, with each security parameter defining the value of the vector component in a respective individual dimension of the multi-dimensional space. FIG. 3A is a diagram illustrating an example of a digital print, in the form of a highly-simplified vector representation, and how it evolves. In the example of FIG. 3A the digital print only includes two security parameters (PAR1 and PAR2) and the security parameters are associated with confidence measures that represent the degree of confidence that the parameter values are, indeed, characteristic of the user. DP(T1), DP(T2) and DP(T3) represent the digital print at respective times T1, T2 and T3 (T1 being the earliest time, T2 a while later and T3 a while later still). In the example of FIG. 3A the combination of values of PAR1 and PAR2 that is considered to be characteristic of the user changes slightly over time from T1 to T3, and the degree of confidence in the digital print increases over the same period.

Figure 3B:
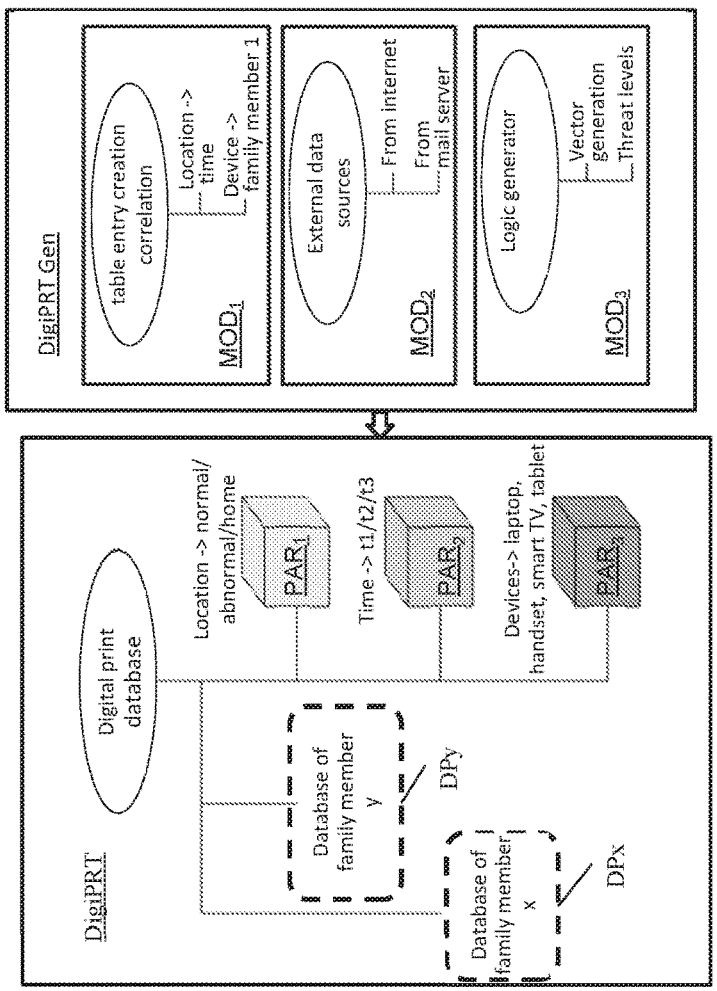
FIGS. 3A and 3B are diagrams representing examples of digital profiles that model behavior that is characteristic of a user.
Figure 3A:
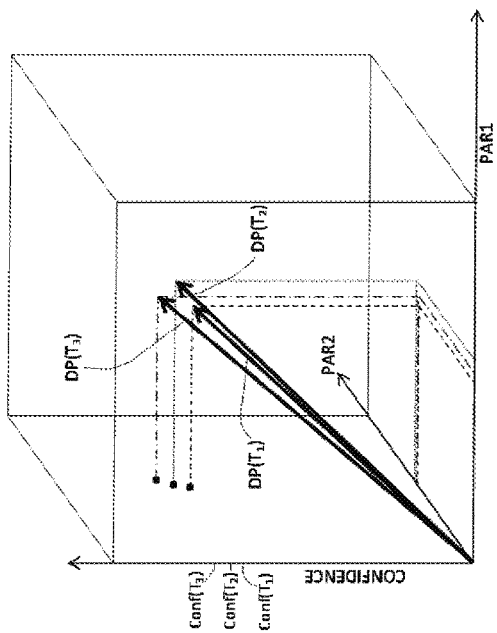

FIG. 3B is a diagram illustrating a digital print database storing database entries defining digital prints for different members of a family. According to this example the digital prints make use of security parameters including: a first parameter PAR1 relating to whether a location corresponds to a "normal" location for this user, their home, an abnormal location, and so on; a second parameter PAR2 relating to different time periods t1, t2, etc. which are regularly-occurring time periods of significance for the user (e.g. time t1 may designate the time period from 9-9.30 am each weekday, if the user has some habitual activity at that time), and a third parameter PAR3 relating to specific devices of different types (laptop, handset, smart TV, tablet, etc.) used by the user. FIG. 3B also illustrates some modules which may be used to create/maintain the digital prints, including: MOD1 a module which determines how parameters are correlated (with each other, with users) and creates appropriate entries in the digital print database; MOD2 a module which handles data coming from external data sources, and MOD3 a logic generator module which generates a vectorial representation of digital prints and assesses the current threat level (i.e. how the security level of the regulated digital security system should be set). When a new user is introduced, at first the regulation method and system do not have much data regarding this user. In certain embodiments the digital print generator is configured to generate an initial model as a basis for the digital print for this user and then to refine the digital print based on a picture of the user's habitual/typical behavior as deduced from user-data INF collected from the user's digital eco-system. Typically the different security parameters contribute to the digital behavior profile (digital print) according to a defined hierarchy or weighting scheme, with certain parameters being assigned greater importance than others for deciding whether or not to flag an inconsistency between current user behavior and the user's customary behavior. For example, one security parameter may relate to the set of electronic devices with which the user habitually interacts (the device's he uses and, if desired, the devices to which his own devices communicate regularly), whereas another security parameter may relate to times when the user establishes communications using his devices. In such an example the digital print may assign a greater importance to the first security parameter (relating to the IDs of the devices) compared to the second (relating to the timing of communications).

The initial model may be generated in various ways including, but not limited to: using default settings, prompting the user to input specified data, inference or prediction, and obtaining initialization data from a source such as a telecoms network operator, Internet service provider, etc. that holds reliable subscriber data relating to the user. Data may be inferred or predicted based, for example, on some seed data or assumptions regarding the characteristics of the user and then inferring or predicting that the same security parameter values apply to this user as apply to other users for whom corresponding data or assumptions are valid.

In certain embodiments, the digital behavior profile is designed to be self-healing, i.e. the system can still function even when certain aspects or dimensions of the profile are still empty/undefined.

In the example of FIG. 1 the digital print for a given user is built up/updated on a continuous basis as fresh user-data is input to the system. The updating process is fed by the new security parameters that are computed by the algorithm ALG. Also, if desired, inference/prediction may still be used even after the initial model of user behavior has been established; in which case the inference may take into account actual user-data INF that has been collected for this user. Thus the digital print is dynamic and will tend to develop into a more and more faithful representation of the user's habitual behavior.

Moreover, the unit managing maintenance of the digital print may be designed to correct aspects of the digital print as the user's circumstances change. For example, if the user moves house the user-data supplied to the system is likely to have various significant differences compared to the earlier user-data upon which the digital print has been based. Thus, immediately after the move there are liable to be relatively frequent occasions when the "current" security parameters do not match the digital profile and these can lead to the setting of a high-security-level access protocol for user accesses to resources. However, the print-manager device may be designed to learn the user's changed habits deriving from his house move, and correct the digital print to reflect the new habits.

There are various techniques that enable a user's routine activity to be deduced with a certain level of confidence from a history of user-data such as the user's location, accelerometer data, compass data, etc.: As an example one can cite, for example, probabilistic techniques such as a Hidden Markov Model (HMM), through time, e.g., the time of the day, day of the week, day of the month, and calendar year. Other methods include, but are not limited to, use of conditional random fields (CRFs), maximum entropy Markov models (MEMM), and Bayesian networks.

The digital print may have a multi-layer structure in which a particular aspect of user behavior is defined at different levels of generality. For example, processing of past user-data may have shown that the user has a habit of driving from one specific GPS location (assumed to be home) to one of several GPS locations (assumed to be workplaces) between 8 and 9 am each weekday morning, and a specific one of the destinations may be more frequent than the others. Accordingly, a multi-leveled digital print may include a parameter which, at a first level, is defined at a high degree of particularity and specifies the user's most typical behavior on a weekday morning from 8 am to 9 am as "drive from home to the frequent destination". However, the same digital print may also define this same parameter at second level that corresponds to a lower level of particularity (i.e. a greater degree of generality) and simply specifies the same behavior as "drive from home to one of the workplace GPS locations".

A description will now be given of how the system of FIG. 1 makes use of the digital print for regulation purposes. As the user goes about daily life and interacts with user-data sources in his eco-system that are configured to provide data to the digital print manager device, these sources provide the DPM device data deriving from their interaction with the user. The algorithm ALG processes the reported data to determine security parameters characterising the user's current behavior and the DPM device performs a comparison of the "current behavior" parameters with the behavior represented by the digital print.

Typically the "current behavior" parameters are compared with a relevant portion of the digital print, i.e. a portion that relates to the user's previously-observed behavior in the same context (e.g. in this place, at this time of day, on this day of the week, in this location, during this same activity, etc.). For example, if User A's mobile phone reports to the DPM device that it has just been switched on and is at GPS location G1 on a Friday at 9 am, the DPM device may compare the reported GPS location with the GPS location(s) that are habitual (i.e. according to the digital print) for a weekday morning. The DPM device regulates the security system of the service provider PROV based on the result of the comparison.

If the "current behavior" parameter(s) is(are) indicative of behavior that matches the portion of the digital print that relates to this context then it may be deduced that the user's current behavior is characteristic of the behavior of this user in the relevant context. In other words, the user behavior is not suspicious. Accordingly, in these circumstances the DPM device sets or maintains the operating state of the security system in a relatively "low security" state, i.e. a state such that—when the user attempts to access the secure service in the future—the security system will automatically implement a first security protocol which places relatively light requirements on the user in terms of authentication/supply of credentials.

If the "current behavior" parameter(s) is(are) indicative of behavior that departs from the digital print then it may be deduced that the user's current behavior is different from this user's usual behavior in the relevant context. In other words, the user behavior may be suspicious. Accordingly, in these circumstances the DPM device sets or maintains the operating state of the digital security system in a relatively "high security" state, i.e. a state such that—when the user attempts to access the secure service in the future—the digital security system will automatically implement a second access protocol which places relatively strict requirements on the user in terms of authentication/supply of credentials.

The evaluation of the current behavior relative to the digital behavior profile can be scheduled in different manners depending on the application and on designer choice. For example, the system may be set to collect user-data over a defined time period (say, ten minutes), then at the end of the period to compute the security parameters that describe the user activity during the data-collection period and to determine whether or not these security parameters are consistent or inconsistent with the digital print. As another example, the system may be arranged to monitor the user-data on a continuous basis to detect when changes occur in activity/context and, at times of change, to collect user-data relating to the "new" activity or context and compare the security parameters computed from this user-data with the digital print so as to decide whether the user behavior after the change is consistent with the user's typical behavior.

Further information will be provided below regarding the evaluation of the current behavior relative to the digital behavior profile.

The nature of the high- and low-security level access protocols can be set differently depending on the application. As one example, a digital security system may have a low-security-level access protocol which allows a user to employ saved password data during a procedure that grants the user access to a resource, and also have a high-security-level access protocol that does not allow the user to employ the saved password data (instead requiring the user to manually input the password). As another example, a digital security system may have a low-security-level access protocol which requires the user to authenticate himself using one authentication factor (e.g. a password) and a high-security-level access protocol which requires multi-factor authentication (e.g. a password and possession of a particular device).

In the example illustrated in FIG. 1, a single digital print mechanism performs the functions of data collection, generation of security parameters, generation of the digital print and determining when the user behavior (as represented by the collected data) diverges from the digital print. However, this is not essential. These functions may be distributed between different units or even different devices, as shall be explained below.

One example of regulation method will now be described with reference to the flow diagram represented in FIG. 2.

As shown in FIG. 2, the method begins at some point of initialization INIT (e.g. when the method begins to be applied to a new user, at start-up of a device housing software implementing the regulation method, and so on). In a first step, S1 (designated COLL in FIG. 2), user-data is collected from the user-data sources. In a next step, S2 (designated COMPUT), security parameters PAR are computed based on the collected data. In the computation, the contextual meaning of information comprised in the user data can be extracted by various techniques including, but not limited to: cross-correlation of one type of sensor data with another type of sensor data, cross-correlating sensor data with the time/date, based on a priori knowledge that the designer has programmed into the system (e.g. events that happen on Mondays to Fridays are likely to relate to work whereas events that occur on Saturdays and Sundays are likely to relate to leisure), and so on. If desired, the computed security parameters PAR may be used to update the digital behavior profile as appropriate (step S2a, designated UpD MOD).

In order to determine whether the user's current activity is consistent with the user's habitual behavior, the computed security parameters PAR are compared to the digital behavior profile in step S3 (designated PAR vs MOD). Typically, the current computed security parameters relate to the user's activity in one particular context whereas the digital behavior profile relates to several different aspects of the user's behavior. Thus, the comparison of the computed security parameters relative to the digital behavior profile typically compares the security parameters to a portion of the digital behavior profile rather than to the whole profile.

Depending on the implementation, step S3 may comprise a multi-level comparison process in which the scope of the comparison may be changed and the "current behavior" parameters compared with a different level in the digital print (e.g. where the context is defined at a more general level than in the preceding comparison). Depending on the inputs, the change in the scope of the comparison may involve a level-change of one level, two levels, or more than two levels.

In certain embodiments, if the evaluation of the security parameters representing the current behavior performed in step S3 shows that there is a particular degree of deviation between the current behavior and the user's habitual behavior then exception rules may be applied to determine whether, in the circumstances, the current behavior corresponds to allowed behavior (step S3a, designated EXCEP in FIG. 2). The nature of the exception rules depends on the particular security parameter in question. However, as one example, consider the case of a user who normally establishes a Bluetooth connection between his cellphone and his car kit each morning between 8.15 am and 8.30 am, and makes a telephone call to a particular number (his office). An exception rule may indicate that Bluetooth-connection behavior between 8.15 am and 8.30 am is still "allowable" if the user's cellphone establishes a Bluetooth connection to car kits in cars that are known to belong to the user's family members.

In applications where the regulation method is implemented on or in connection with a mobile user device having network connectivity (such as a smartphone, tablet, laptop, etc.) it may be convenient for the step of applying exception rules to be performed by network operator apparatus. This reduces the memory space and processing power that the regulation method requires from the mobile user device.

Based on the comparison between the security parameters and the digital behavior profile (and any application of exception rules) a determination is made whether or not the security parameters PAR are deemed consistent with the profile (step S4, designated PAR=MOD?). The degree of similarity that is required in order for this determination to give a result of "consistent" may be set differently depending on the application, depending on the security parameter(s) in question (the degree of variability in "normal" behavior may be different for different activities), or dependent on other factors. For example, the method may be arranged to increase or decrease the degree of similarity that is required, dependent on the extent to which user behavior has been suspicious over the last few hours, over the last day, or some other period. As another example, the degree of similarity that is required for a finding of "consistent" may be set differently depending on the digital security system which is being regulated by the method (e.g. a service provider could be offered a choice of how closely he wishes user behavior to comply with the digital behavior profile in order for a low-security-level operating state to be set).

The calculations involved in the comparison of the security parameters to the digital behavior profile vary depending on the nature of the different security parameters and the manner in which the digital behavior profile is designed. As one example, when security parameters and dimensions of the digital behavior profile are represented using vectors, comparison between the current security parameters and the digital behavior profile may involve calculating the vector distance between a first vector defined by the current security parameters and a second vector corresponding to the same dimensions in the profile. In such a case the calculated distance may be compared against one or more threshold values in order to decide whether the current behavior is consistent/inconsistent with the profile, and/or to decide whether or not exception-rule processing should be applied.

If the current security parameters PAR are determined to be consistent with the digital behavior profile in step S4, then the regulation method performs step S5 (designated RegSig(LSL PROT)) in which it sets (or maintains) the regulated digital security system in an operating state such that the user's future access requests will result in the digital security system automatically applying a low-security-level access protocol.

If the current security parameters PAR are determined to be inconsistent with the digital behavior profile in step S4, then the regulation method performs step S6 (designated RegSig(HSL PROT)) in which it sets (or maintains) the regulated digital security system in an operating state such that the user's future access requests will result in the digital security system automatically applying a high-security-level access protocol, i.e. one which makes it more onerous for the user to access the relevant resource. These steps S5 and S6 may involve transmission of a control signal RegSig to the regulated digital security system. The method maybe implemented so that a control signal is sent continuously or on a regular basis (i.e. irrespective of whether a change in operating state of the digital security system is required), or the method may be implemented so that the control signal is sent only when a change is required in the operating state of the digital security system.

In the example illustrated in FIG. 2, steps S1 to S5/S6 are performed repeatedly as the user's activity is monitored.

It is to be understood that references to the evaluation of "current behavior" do not mean that the regulation method is limited to real-time operation. If desired or expedient there could be a time delay between the moment or time period during which the user-data is collected and the time when the security parameters computed from the user-data is compared to the digital behavior profile.

Certain embodiments of regulation method and regulation system may include a validation mechanism allowing the user, or a third party, to validate some current behavior even though there is deviation between the current security parameters and the digital behavior profile. Such a validation mechanism includes a notification procedure for bringing the deviation to the attention of the user/third party, and a validation procedure. When the user himself can validate the current behavior it is advantageous for the validation procedure to include security measures to ensure that the validation is not being performed by an unauthorized party impersonating the user. However, this may not be necessary (or the security measures may be reduced) in a case where the validation is performed by a trusted third party, e.g. a telecoms network operator. In embodiments of this type, the current behavior is not determined to be inconsistent with the digital behavior profile if the behavior has been validated using the validation mechanism.

It is to be noted that, in certain embodiments, the regulation method previously described in FIG. 2 is executed independently of any user access request to the resource. In other words, the method is executed and the level of the access protocol to be applied (high or low security-level access protocol) is determined without any need for a user access request to a resource to be received. In short, the method is not triggered by a request by a user to access a resource.

Regulation systems according to some embodiments can be implemented using a wide variety of device architectures. Some of these are described below with reference to FIG. 4, FIGS. 5A and 5B, and FIGS. 6A to 6D. However, the skilled person will readily understand that the functional units making up the regulation system can be distributed between devices in additional ways that are not illustrated in the figures.

Figure 4:
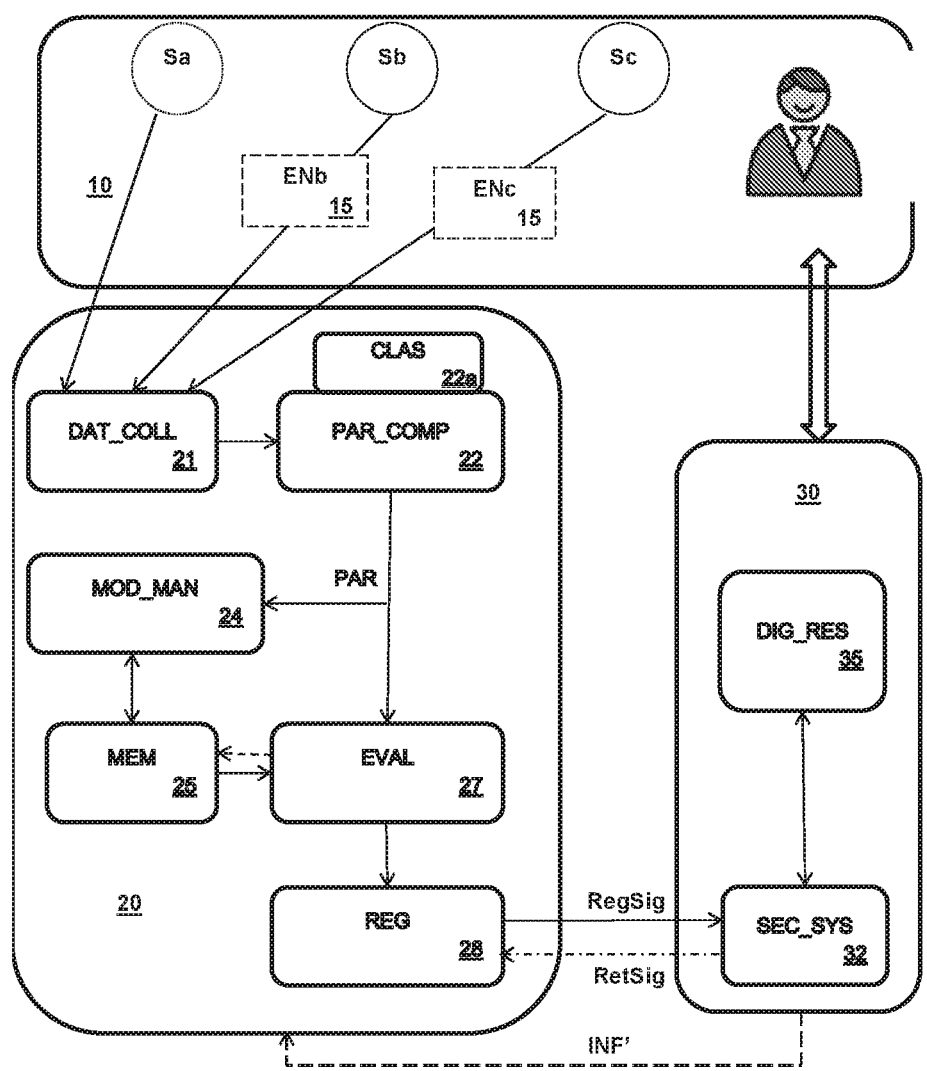
FIG. 4 is a block diagram illustrating functional units that may be used to implement an example of a regulation system as illustrated in FIG. 1, using a dedicated regulation device regulating an external digital security system.

FIG. 4 illustrates an example of a regulation system operating in an environment which mirrors that illustrated in FIG. 1. In FIG. 4 the eco-system 10 of a user U includes three user-data sources Sa, Sb and Sc, and these supply user-data to a device 20 which embodies a regulation system according to an embodiment of the invention. In this example the application domain relates to a server device 30 which makes a digital resource 35 available for access by users under the control of a digital security system 32. In this example, the digital security system 32 is a software application running on the server device 30. The regulation device 20 controls the operating state of the digital security system 32.

In the example of FIG. 4, the user-data sources Sa, Sb and Sc are all sensors. Enablers 15 are provided to pre-process data from the sensors Sb and Sc so as to facilitate its subsequent processing in the regulation device 20. The sensors Sa-Sc may be in devices belonging to user U, third party devices, public or shared devices. These devices are configured to supply user-data to a data collection unit 21 of the regulation device 20. The necessary "configuring" of the data sources so that they perform the transmission may be achieved in any convenient way, e.g. installation of appropriate software in the devices housing the sensors, physical connection between the data sources and the data collection device 21, and so on. Any convenient wired or wireless transmission method may be used to achieve the transmission of the data.

In this example, the regulation device 20 includes, in addition to the data collection unit 21, a parameter computation unit 22 (which may include a classifier for assigning collected data to different categories) for computing security parameters PAR indicative of the user behavior captured by the collected data, a manager unit 24 for managing creation and maintenance/updating of the digital behavior profile that models the user's characteristic behavior, a memory 25 storing the digital behavior profile, an evaluation unit 27 for evaluating the extent to which the computed security parameters PAR are consistent with the digital behavior profile, and a regulation unit 28 for controlling the digital security system 32.

In the example illustrated by FIG. 4, the regulation unit 28 of the regulation device 20 transmits a control signal, RegSig, to the digital security system 32 of the server device 30 to control the operating state of the digital security system 32. Optionally, the digital security system may send information back to the regulation unit 28 of the regulation device 20, via a signal RetSig, for example to keep the regulation device 20 informed of the current operating state of the digital security system 32.

If desired, the server 30 may supply the data collection unit 21 of the regulation device 20 with data INF' regarding the user's access to the digital resource 35 (because this data may help to build up a fuller model of the user's habitual activities).

Figure 5B:
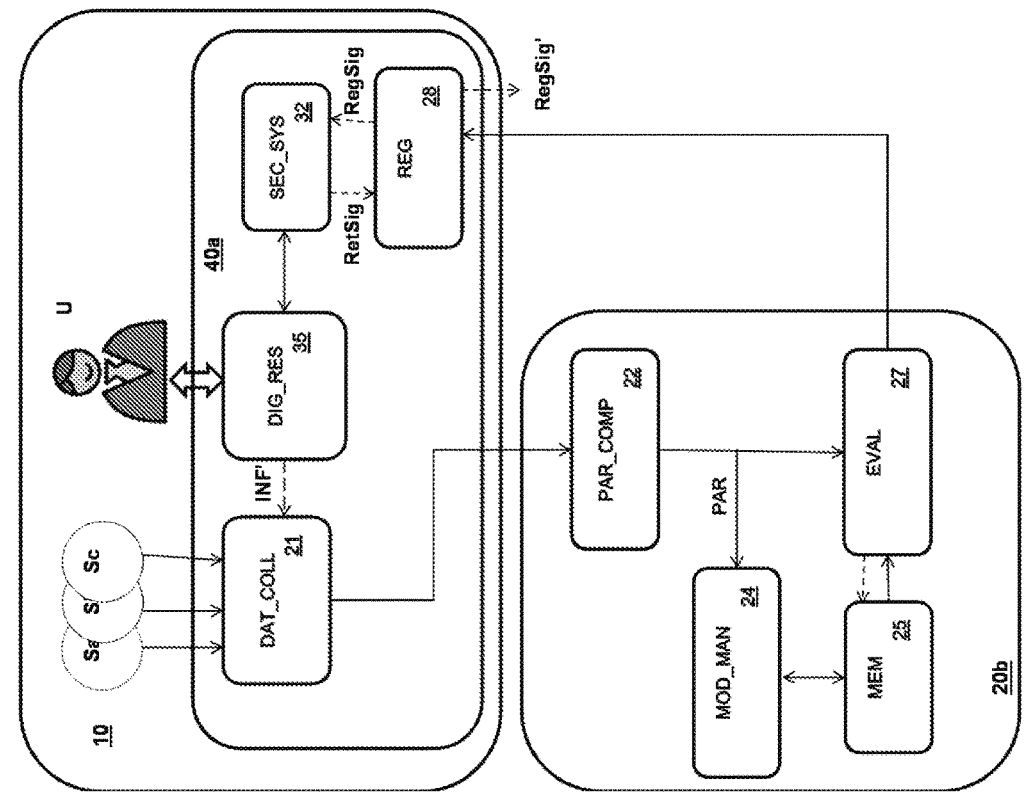
FIGS. 5A and 5B are functional block diagrams illustrating further embodiments of the regulation system, in which a user device implements a data collection unit of the system.
Figure 5A:
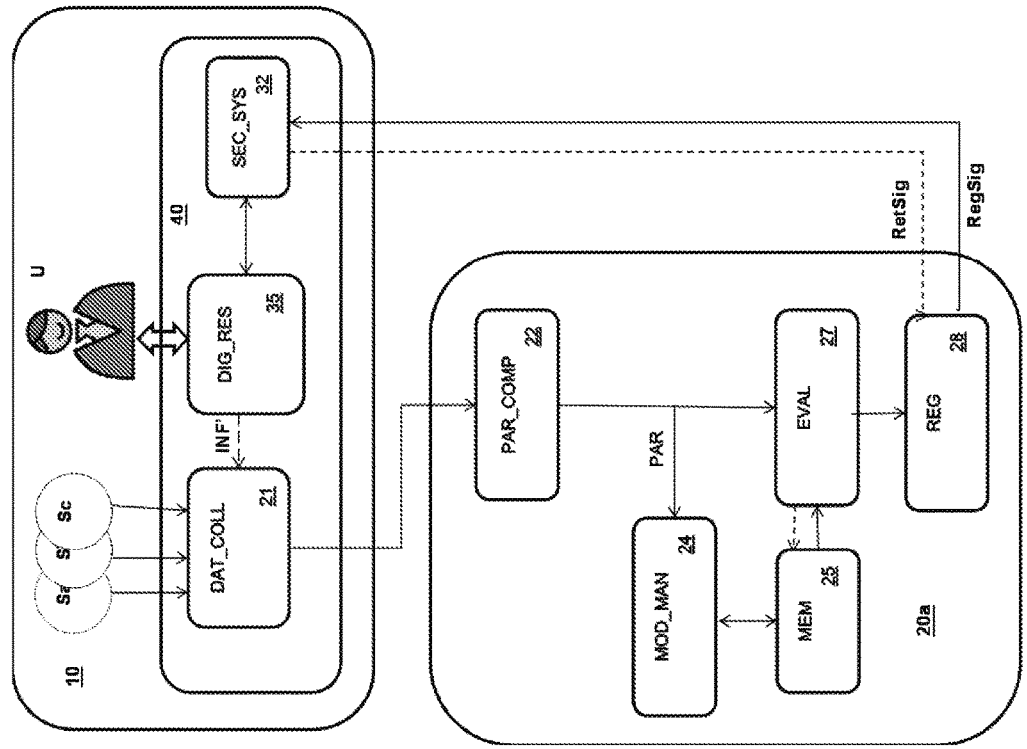

FIGS. 5A and 5B relate to embodiments in which the digital security system 35 being regulated is implemented (at least in part) on a user device 40 or 40a, to control access to a digital resource 35 held on the user device 40/40a.

In the examples illustrated in FIGS. 5A and 5B, the user device 40 (40a) is configured to perform collection of data for processing by a device 20a (20b) which generates and maintains the digital behavior profile. If desired, other devices besides the user device 40 (40a) may supply user-data to the device 20a (20b), although this is not illustrated in the drawings.

In the example illustrated in FIG. 5A, the user-data is supplied to a regulation device 20a which includes units comparable to the units 22-28 discussed above in relation to FIG. 4, and which outputs a control signal RetSig to control the operating state of the digital security system 32 in the user device 40.

In the example illustrated in FIG. 5B, the user-data is supplied to a device 20b which includes units comparable to the units 22-27 discussed above in relation to FIG. 4, i.e. which perform the computation of security parameters, generation and maintenance of the digital behavior profile and comparison of the computed security parameters to the digital behavior profile. The regulation unit 28 is provided in the user device 40a and controls the operating state of the digital security system which is also on-board the user device 40a. If desired, the regulation unit 28 of the user device 40a can be configured to output a control signal RegSig' to control the operating state of one or more digital security systems external to the user device (e.g. digital security systems of service providers who offer user U access to resources).

FIGS. 6A to 6D relate to embodiments in which all (or most of) the regulation system is implemented on a user device and the digital security system 32 being regulated is also implemented (at least in part) on the user device 40.

Figure 6A:
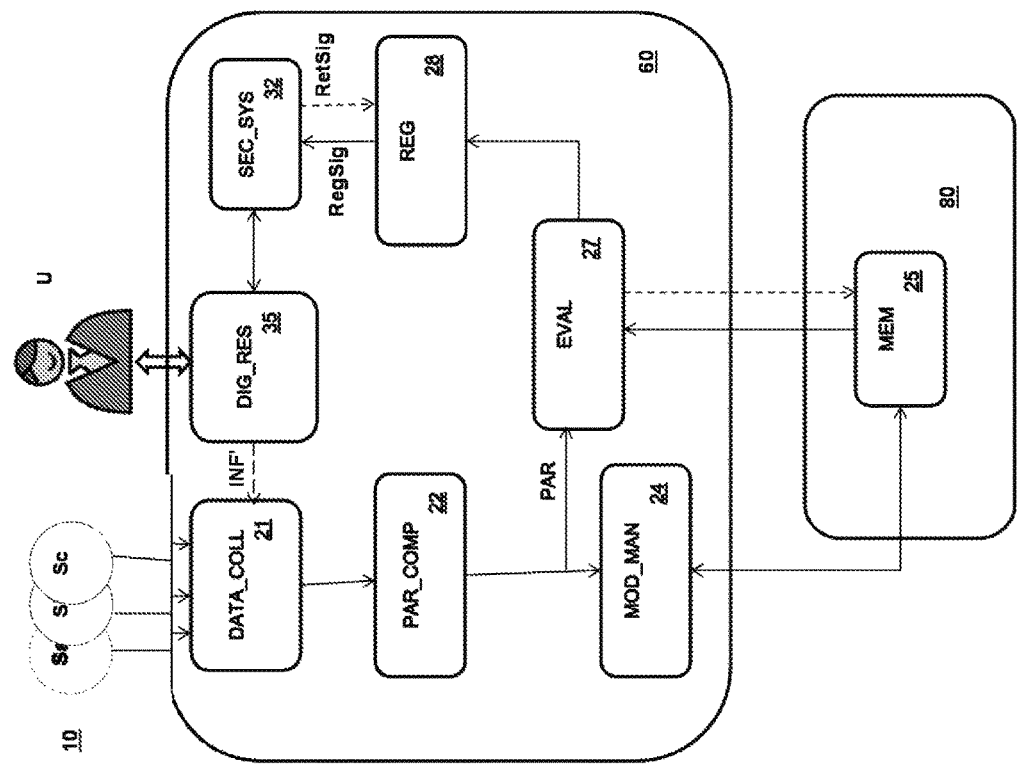
FIGS. 6A to 6D are block diagrams illustrating further examples of different regulation systems, in which the functional modules are distributed in various ways between different devices.

In the example illustrated in FIG. 6A, all the functional units of the regulation system are implemented on the user device 50. Further, in this embodiment a communications unit 29 in the user device 50 may be used to access a remote server (not shown) which implements exception-rule processing as described above. For example, in a case where there is some divergence between the current behavior and the digital behavior profile a notification, Notif, including details of the current behavior and its context may be sent to the remote server (with some details of the digital behavior profile, if required). The response, Rep, from the server contains an indication of whether or not the current behavior counts as "acceptable behavior" according to the exception rules.

Figure 6B:
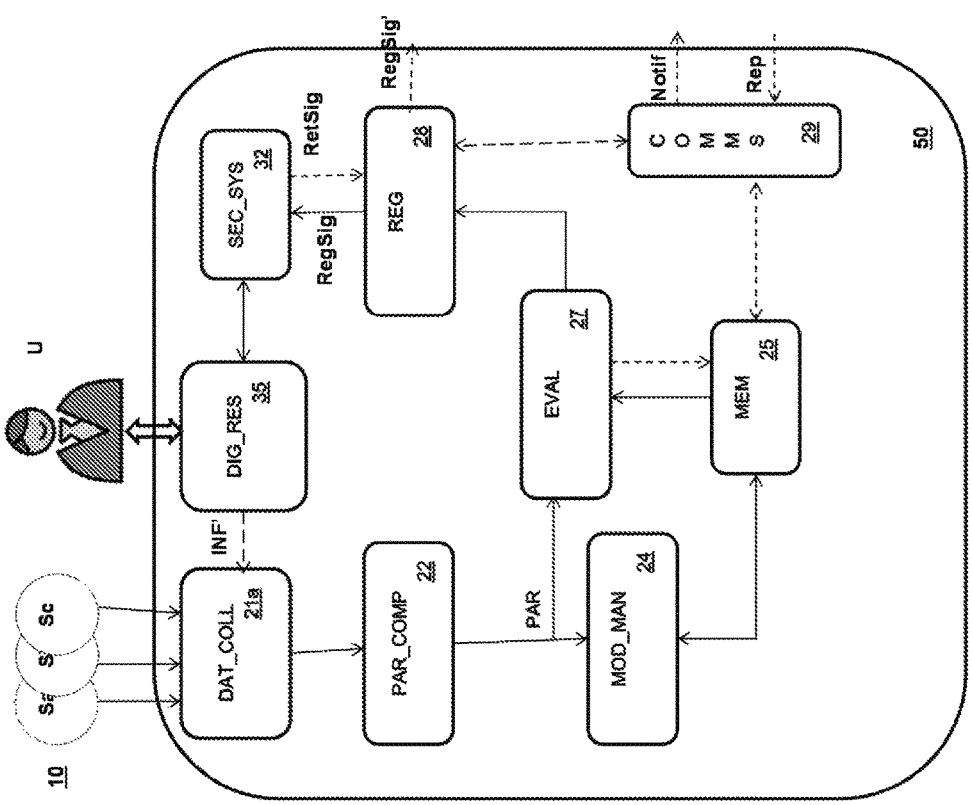

In the example illustrated in FIG. 6B, the memory 25 storing the digital behavior profile is external to the functional units of the regulation system that are installed in the user device 60. In this example the memory 25 is provided in an external device 80 (which may be a dedicated storage device, or it may have other functions).

Figure 6D:
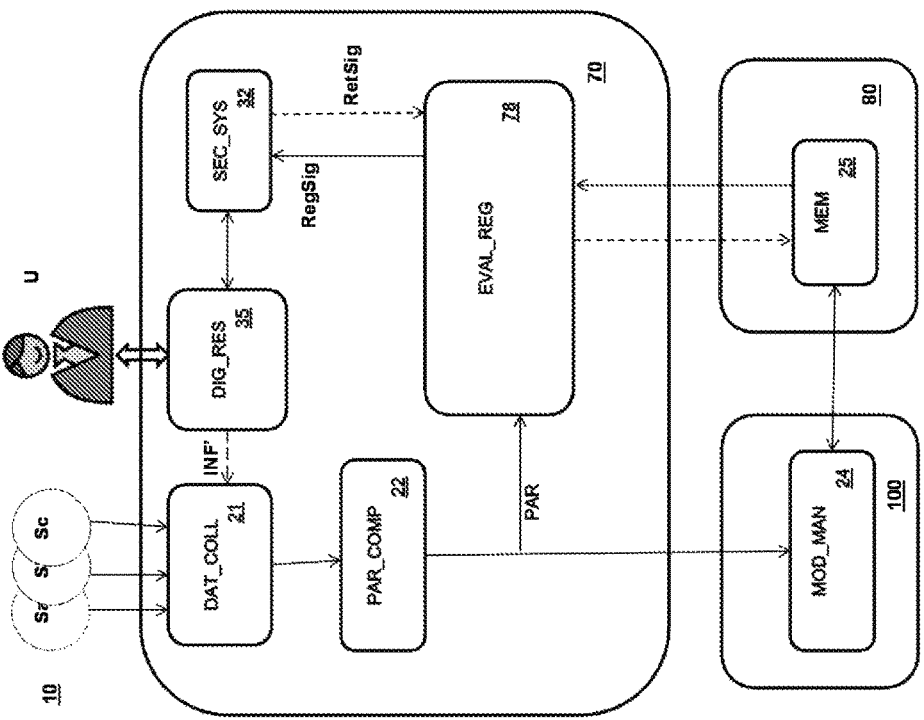
Figure 6C:
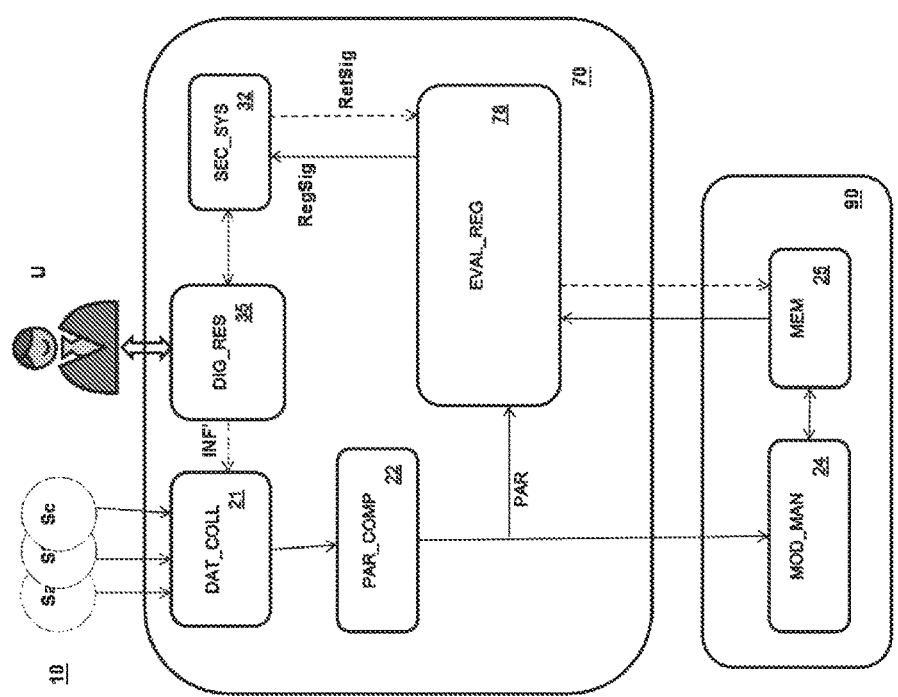

The example illustrated in FIG. 6C is generally similar to the example illustrated in FIG. 6B except that in this case both the memory 25 storing the behavior profile and the manager unit 24 for generating and maintaining the digital behavior profile are implemented on a device 90 external to the user device 70 that comprises the regulation unit. Also, in this example the evaluation and regulation units are integrated into a single functional unit 78 that performs both functions.

The example illustrated in FIG. 6D is generally similar to the example illustrated in FIG. 6C except that in this case although the memory 25 and the manager unit 24 are both external to the user device 70, they are implemented in separate devices 80, 100.

Compared to the embodiment of FIG. 6A, the embodiments of FIGS. 6B, 6C and 6D have an advantage deriving from the fact that the digital behavior profile is not stored on a user device. In the embodiments of FIGS. 6B-D, if the user device should happen to be lost or stolen, the user could always acquire a replacement device and he would still have the benefit of the digital behavior profile that has been developed, over time, to model his characteristic behavior.

In practice, some or all of the illustrated functional units of regulation systems according to some embodiments described herein are likely to be implemented in the form of software (computer programs, executable instructions) implemented using one or more processors. It should be mentioned that, in practice, there may not be a one-to-one relationship between the individual described functional units and corresponding component blocks of the software. In other words, in cases where the figures represent a single module performing a particular function, in practice two or more cooperating modules may be used to implement the corresponding function. In a similar way, in cases where the drawings show two or more separate modules which cooperate to perform various functions, in practice the relevant functions may be implemented using a different number of modules and the distribution of functions between those modules may differ from the detailed description in this document.

Although the present invention has been described above with reference to certain specific embodiments, it will be understood that the invention is not limited by the particularities of the specific embodiments. Numerous variations, modifications and developments may be made in the specified embodiments within the scope of the appended claims.

For instance, it will be understood that features taken from different specific embodiments can be combined in different combinations and sub-combinations. For example, the combined evaluation and regulation unit 78 illustrated in the examples of FIGS. 6C and 6D may be used in embodiments that otherwise conform to FIGS. 4, 5A, 6A and 6B. As another example, embodiments other than that of FIG. 6A may make use of a communications unit 29 to send notifications and receive responses relating to application of exception rules. As yet another example, although only the embodiments of FIGS. 5B and 6A are illustrated as employing regulation units which send control signals to more than one digital security system, the other embodiments of regulation system can also possess this functionality.

Further, although the description of the specific embodiments refers to regulation of a multi-level digital security system that comprises a high-security-level access protocol and a low-security-level access protocol, some embodiments extend to regulation of digital security systems which include additional security levels, e.g. involving three, or more than three access protocols offering differing levels of security. In one embodiment of this type, the regulation method and system set the operating state of the digital security system into an intermediate security level (between the high and low levels) at times when the current behavior deviates from the digital behavior profile but has been deemed "acceptable" according to an exception rule. In another embodiment of this type, the regulation method and system are designed to control the digital security system to step down or step up through security levels progressively (in steps of one level, or more than one level) as the user's "current" behavior matches the digital behavior profile, or fails to match, over a progressively longer time period and/or in a progressively increasing number of contexts.

What is claimed is:

1. A computer-implemented method of regulating a digital security system, the method comprising, independently of any access request from a user to a resource:
    collecting data from a set of user-data sources, the collected data comprising information indicative of a user activity;
    based on the collected data, computing a set of one or more security parameters characterizing the user activity;
    comparing the computed set of one or more security parameters to a digital profile, the digital profile representing a model of behavior that is characteristic of said user, and
    responsive to the comparing indicating that the user activity is inconsistent with the digital behavior profile, regulating the digital security system to be in a first operating state wherein the digital security system controls access to the resource for said user according to a high-security-level access protocol, wherein the digital security system controls access to the resource according to a multi-level security protocol including the high-security-level access protocol and a low-security-level access protocol.

2. The regulation method according to claim 1, further comprising:
    responsive to the comparing indicating that the user activity is consistent with the digital profile, regulating the digital security system to be in a second operating state wherein the digital security system controls access to the resource for said user according to the low-security-level access protocol.

3. The regulation method according to claim 1, wherein:
    when the comparing indicates that the user activity departs from the digital profile, a set of one or more exception rules is applied to calculate whether or not the user activity conforms to an acceptable behavior defined by an exception rule, and
    when the calculation determines that the user activity conforms to the acceptable behavior, the comparing indicates that the user activity is consistent with the digital profile.

4. The regulation method according to claim 3, wherein:
    the multi-level security protocol comprises an intermediate-security-level access protocol, and
    when the calculation determines that the user activity conforms to the acceptable behavior, the digital security system is regulated to be in a third operating state wherein the digital security system controls access to the resource for said user according to the intermediate-security-level access protocol.

5. The regulation method according to claim 1, further comprising updating the digital profile based on the computed set of security parameters.

6. The regulation method according to claim 1, wherein computing the security parameters comprises:
    categorizing collected data into defined categories, and
    for each category, assigning a pattern to collected data assigned to said category.

7. The regulation method according to claim 6, wherein:
    the digital profile comprises user-characteristic pattern data for at least one of the defined categories, and
    comparing the computed security parameters to the digital profile comprises comparing said user-characteristic pattern data of the digital profile to a pattern determined for received monitoring data assigned to the same category.

8. A non-transitory computer-readable medium having stored thereon instructions to implement the method of claim 1 when the instructions are executed by a processor.

9. A computerized regulation system configured to regulate a digital security system, the computerized regulation system comprising:
    a data collection unit configured to receive data from a set of user-data sources, the collected data comprising information indicative of a user activity;
    a computation unit configured to compute, from the collected data, security parameters characterizing the user activity;
    an evaluation unit configured to determine whether the security parameters computed by the computation unit are consistent with a digital profile, the digital profile representing a model of behavior that is characteristic of said user, and
    a regulation unit configured, in response to the evaluation unit determining that the user activity is inconsistent with the digital profile, to regulate the digital security system to be in a first operating state wherein the digital security system controls access to a resource for said user according to the high-security-level access protocol, wherein the digital security system is configured to control access to the resource according to a multi-level security protocol including the high-security-level access protocol and a low-security-level access protocol.

10. A regulation system according to claim 9, wherein the regulation unit is provided in a first device and is configured to regulate a digital security system of a second device external to the first device and/or a digital security system of said first device.

11. A regulation system according to claim 10, further comprising a storage unit storing data of said digital profile, wherein the storage unit is in said first device or in a further device external to the first device.

12. A regulation system according to claim 11, further comprising a profile manager configured to update the digital profile based on security parameters computed by the computation unit, wherein the profile manager is in said first device, in said further device or in a supplementary device external to the first and further devices.

13. A regulation system according to claim 9, further comprising a communications unit configured to communicate with an external server over a network;
    wherein the evaluation unit is configured:
    to send a notification to the external server, via the communications unit, upon determining that the user activity departs from the digital profile,
    to discriminate, in a response received from the server, an indication that the user activity notified to the server qualifies as acceptable behavior according to an exception rule, and
    to indicate that the user activity is consistent with the digital profile when said indication is discriminated in the response received from the server.

14. An electronic device comprising a regulation system according to claim 9.

15. The regulation system according to claim 9, wherein the regulation unit is further configured, in response to the evaluation unit determining that the user activity is consistent with the digital profile, to regulate the digital security system to be in a second operating state wherein the digital security system controls access to the resource for said user according to the low-security-level access protocol.

16. The regulation system according to claim 9, wherein the evaluation unit is further configured,
   upon determination that the user activity departs from the digital profile, to apply a set of one or more exception rules to calculate whether or not the user activity conforms to an acceptable behavior defined by an exception rule, and
      upon determination that the user activity conforms to the acceptable behavior, to indicate that the user activity is consistent with the digital profile.

17. The regulation system according to claim 16, wherein:
   the multi-level security protocol comprises an intermediate-security-level access protocol, and wherein the regulation unit is further configured,
      when the evaluation unit determines that the user activity conforms to the acceptable behavior, to regulate the digital security system to be in a third operating state wherein the digital security system controls access to the resource for said user according to the intermediate-security-level access protocol.

18. The regulation system according to claim 9, further configured to update the digital profile based on the computed set of security parameters.

19. The regulation system according to claim 9, wherein the computation unit is further configured to:
   categorize collected data into defined categories, and
   for each category, assign a pattern to collected data assigned to said category.

20. The regulation system according to claim 19, wherein:
   the digital profile comprises user-characteristic pattern data for at least one of the defined categories, and the evaluation unit is further configured to compare said user-characteristic pattern data of the digital profile to a pattern determined for received monitoring data assigned to the same category.

* * * * *